(12) United States Patent
Hou et al.

(10) Patent No.: US 12,392,701 B1
(45) Date of Patent: Aug. 19, 2025

(54) HIGH-VOLTAGE CABLE INSULATION MATERIAL CONTINUOUS EXTRUSION PROCESSING CHARACTERISTIC EVALUATION AND OPTIMIZATION METHOD AND APPARATUS

(71) Applicant: ELECTRIC POWER RESEARCH INSTITUTE., CHINA SOUTHERN POWER GRID, Guangzhou (CN)

(72) Inventors: Shuai Hou, Guangzhou (CN); Mingli Fu, Guangzhou (CN); Lei Jia, Guangzhou (CN); Yunpeng Zhan, Guangzhou (CN); Wenbo Zhu, Guangzhou (CN); Baojun Hui, Guangzhou (CN); Xiaolin Li, Guangzhou (CN); Lingmeng Fan, Guangzhou (CN); Yifan Zhang, Guangzhou (CN); Bin Feng, Guangzhou (CN)

(73) Assignee: ELECTRIC POWER RESEARCH INSTITUTE., CHINA SOUTHERN POWER GRID, Guangzhou (CN)

(*) Notice: Subject to any disclaimer, the term of this patent is extended or adjusted under 35 U.S.C. 154(b) by 0 days.

(21) Appl. No.: 19/104,791

(22) PCT Filed: Dec. 6, 2022

(86) PCT No.: PCT/CN2022/136788
§ 371 (c)(1),
(2) Date: Feb. 19, 2025

(87) PCT Pub. No.: WO2024/087330
PCT Pub. Date: May 2, 2024

(30) Foreign Application Priority Data

Oct. 28, 2022 (CN) .......................... 202211331206.3

(51) Int. Cl.
*G01N 11/04* (2006.01)
*G01N 3/24* (2006.01)
(Continued)

(52) U.S. Cl.
CPC .............. *G01N 11/04* (2013.01); *G01N 3/24* (2013.01); *G01N 11/02* (2013.01); *G01N 11/06* (2013.01);
(Continued)

(58) Field of Classification Search
CPC .......... G01N 3/24; G01N 11/02; G01N 11/04; G01N 11/06; G01N 11/08; G01N 2011/006; G01N 2011/0026
See application file for complete search history.

(56) References Cited

U.S. PATENT DOCUMENTS

| 11,378,505 B1 | 7/2022 | Tseng et al. |
| 2019/0320691 A1* | 10/2019 | Budde ..................... A23P 30/34 |
| 2023/0264408 A1* | 8/2023 | Venturi ................. B29C 48/395 |
| | | 702/183 |

FOREIGN PATENT DOCUMENTS

| CN | 1664556 A | 9/2005 |
| CN | 1773245 A | 5/2006 |

(Continued)

OTHER PUBLICATIONS

Nguyen, Bao Kha, et al. "Real time measurement and control of viscosity for extrusion processes using recycled materials" Polymer Degradation and Stability 102 (2014) 212-221. (Year: 2014).*
(Continued)

*Primary Examiner* — Paul M. West
(74) *Attorney, Agent, or Firm* — Taft Stettinius & Hollister LLP

(57) ABSTRACT

The present application provides a high-voltage cable insulation material continuous extrusion processing characteris-
(Continued)

tic evaluation and optimization method and apparatus. The method comprises: continuously extruding a material under test as a melt, measuring and recording an inlet pressure P, a mass growth rate w, and the diameter D' of a melt sample strip, and obtaining apparent shear viscosity $\eta_a(t)$ (step A1); obtaining an outlet expansion rate $\delta$ (step A2); recording and displaying curves $\eta_a(t)$ and $\delta(t)$, and treating the time corresponding to an increase of a set percentage on the curves as a cross-linking starting time TX (step A3); selecting a reference sample for testing, and determining a cross-linking reaction starting time TS according to $\eta_a(t)$ and $\delta(t)$ curves of the reference sample (step A4); and defining an index $\alpha$ according to Tx and Ts.

20 Claims, 4 Drawing Sheets

(51) Int. Cl.
  *G01N 11/00* (2006.01)
  *G01N 11/02* (2006.01)
  *G01N 11/06* (2006.01)
  *G01N 11/08* (2006.01)

(52) U.S. Cl.
  CPC ...... *G01N 11/08* (2013.01); *G01N 2011/0026* (2013.01); *G01N 2011/006* (2013.01)

(56) References Cited

FOREIGN PATENT DOCUMENTS

| | | |
|---|---|---|
| CN | 101430267 A | 5/2009 |
| CN | 104568663 A | 4/2015 |
| CN | 106124362 A | 11/2016 |
| CN | 114216926 A | 3/2022 |

OTHER PUBLICATIONS

International Searching Authority / CN, International Search Report & Written Opinion issued in corresponding Application No. PCT/CN2022/136788, dated Jun. 15, 2023, 12 pp.

\* cited by examiner heating a tested material to a melt at a set temperature, the continuously extruding the melt through a capillary mold, continuously measuring and record an inlet pressure $P$ of a capillary inlet, a mass growth rate $w$ of the extruded melt, and a diameter $D'$ of a melt strip during the extrusion, obtaining an apparent shear viscosity of a melt flow

↓ calculating an outlet expansion rate $\delta$ of the melt by using the diameter $D'$ of the melt strip

↓ recording and displaying curves $\eta_a(t)$ and $\delta(t)$ of the apparent shear viscosity and the outlet expansion rate of the melt changing with time, determining time corresponding to an increase of a set percentage in the $\eta_a(t)$ or $\delta(t)$ on the curve $\eta_a(t)$ or $\delta(t)$ as starting time of a cross-linking reaction, which is recorded as $T_X$

↓ at a step A4, selecting a reference sample, testing the reference sample according to the steps A1 to A3, and determining starting time $T_S$ of a cross-linking reaction of the reference sample according to the curves $\eta_a(t)$ and $\delta(t)$ of the reference sample

↓ at a step A5, defining an index $\alpha$ according to the $T_X$ and $T_S$ as a digital characteristic quantity for characterizing the continuous extrusion processing characteristic of the tested material

FIG. 1

HIGH-VOLTAGE CABLE INSULATION MATERIAL CONTINUOUS EXTRUSION PROCESSING CHARACTERISTIC EVALUATION AND OPTIMIZATION METHOD AND APPARATUS

CROSS-REFERENCE TO RELATED APPLICATION

The present application is a US national stage application of PCT international application PCT/CN2022/136788, filed on Dec. 6, 2022, which claims priority to Chinese Patent Application No. 202211331206.3, filed with the China National Intellectual Property Administration and entitled "High-Voltage Cable Insulation Material Continuous Extrusion Processing Characteristic Evaluation and Optimization Method and Apparatus" on Oct. 28, 2022, which is incorporated herein by reference in its entirety.

TECHNICAL FIELD

The present disclosure relates to the field of crossover cable technology, and particularly to a method and an apparatus for evaluating and optimizing a continuous extrusion processing characteristic of a high-voltage cable insulation material.

BACKGROUND

Submarine cables are the core components of the cross-sea power transmission system. Unlike the land cable, the submarine cable joint is more difficult and costly to manufacture. Accordingly, in engineering, it is always hoped that the length of a single-segment submarine cable product is as long as possible in order to reduce the total number of intermediate joints or factory joints of the submarine cables.

Cross-linked polyethylene is currently the most important insulation material for high-voltage submarine cables. The material is mainly composed of polyethylene resin and a certain proportion of antioxidants and cross-linking agents. The manufacturing process of the cable insulation layer includes: under a high-temperature condition that is lower than the rapid decomposition temperature of the cross-linking agent and higher than the melting temperature of polyethylene, a screw extruder is employed to heat the cross-linkable polyethylene insulation material into a melt, the melt is continuously extruded onto a cable conductor through the head of the screw extruder, and then enters a cross-linked pipeline, continuous crosslinking is carried out under a high-temperature condition where the cross-linking agent can decompose rapidly. In the above process, the continuous and uninterrupted operation time of the extruder is an important limiting factor for the length of the single-segment cable product.

Based on the technical principle of cross-linked cable production, during the long-term extrusion process of the cross-linkable polyethylene cable insulation material, the material may inevitably be retained in a local position in the extruder due to an uneven melt fluidity and the existence of a local dead corner with a low fluidity in the extruder. At the extrusion temperature, although the decomposition rate of the cross-linking agent is slow, pre-crosslinking may also occur in the long-term retained material due to the decomposition of the cross-linking agent. Part of the pre-cross-linked material may form gel point defects in the cable insulation. The gel point defects may easily cause blockage of the extruder filter, thereby limiting the continuous extrusion time. Some gel points that penetrate through the filter may also cause a significant decrease in the electrical properties of the insulation layer. Accordingly, after unacceptable pre-crosslinking occurs, the extruder must be stopped and the interior of the extruder must be cleaned as a whole, which thus limits the continuous processing time of the extruder.

A key to manufacturing the long-length submarine cable is to extend the continuous production time of the cable as much as possible, this may be required to select the insulation material with better long-term extrusion processing property through experiments, and the processing parameters of the extruder need to be optimized in order to find the optimal long-term process condition. However, currently in the cable manufacturing industry, there is a lack of a method capable of accurately evaluating the continuous extrusion processing characteristic of the cross-linked polyethylene cable insulation material, and there is also a lack of quantitative evaluation index to characterize such characteristic. On the one hand, the cable manufacturing industry lacks clear criteria for the selection of insulation materials; on the other hand, in the actual production process of the submarine cable, the processing parameters and the length of continuous production time of the extruder can only be determined based on experiences. If the continuous production time is set too long, pre-crosslinking of the material may occur during the production process, resulting in a decrease in the insulation property of the cable. If the continuous production time is set too short, the material property cannot be fully utilized and the cable product cannot obtain a maximum length thereof. Since the high-voltage cable insulation material is relatively expensive, repeated attempts of the high-voltage cable insulation material in the large-scale production device may inevitably cause a lot of material waste and cost consumption, and accordingly, also cause high costs and long cycles for adjusting and optimizing the processing parameters of extruders . . .

How to reasonably select an insulation material having the long-term extrusion processing property, and how to reasonably limit the continuous extrusion time in order to avoid pre-crosslinking of the material during the extrusion process are key factors in determining the quality of the cable insulation layer. However, there is currently a lack of effective evaluation methods for the long-term extrusion processing property of materials, there is a lack of reliable data support for the optimization of insulation material, and there is also a lack of objective basis for setting the continuous extrusion time for the manufacture of long-length submarine cables. The present application aims to provide a method and an apparatus for evaluating and optimizing a continuous extrusion processing characteristic of a high-voltage cable insulation material. The method and apparatus can be utilized to evaluate and optimize cross-linkable polyethylene insulation materials adapted to the long-term extrusion processing, and can also be utilized to optimize the process parameters during long-term extrusion processing to implement the optimal setting of the extrusion processing process parameters for a given material.

SUMMARY

According to the embodiments of the present disclosure, a method and an apparatus for evaluating and optimizing a continuous extrusion processing characteristic of a high-voltage cable insulation material are provided.

In the first aspect of the present disclosure, a method for evaluating and optimizing a continuous extrusion processing characteristic of a high-voltage cable insulation material is provided, including:

at a step A1, heating a tested material to a melt at a set temperature, continuously extruding the melt through a capillary mold, continuously measuring and recording an inlet pressure P of a capillary, a mass growth rate w of an extruded melt, and a diameter D' of a melt strip during the extrusion, obtaining an apparent shear viscosity $\eta_a$ of a melt flow;

at a step A2, calculating an outlet expansion rate d of the melt by using the diameter D' of the melt strip;

at a step A3, recording and displaying curves $\eta_a(t)$ and $\delta(t)$ of the apparent shear viscosity and the outlet expansion rate of the melt changing with time, determining time corresponding to an increase of a set percentage in the $\eta_a(t)$ or $\delta(t)$ on the curve $\eta_a(t)$ or $\delta(t)$ as starting time of a cross-linking reaction, which is recorded as $T_X$;

at a step A4, selecting a reference sample, testing the reference sample according to the steps A1 to A3, and determining starting time $T_S$ of a cross-linking reaction of the reference sample according to the curves $\eta_a(t)$ and $\delta(t)$ of the reference sample;

at a step A5, defining an index $\alpha$ according to the $T_X$ and $T_S$ as a digital characteristic quantity for characterizing the continuous extrusion processing characteristic of the tested material.

In an embodiment, the step A1 includes:

at a step A1.1, calculating a shear rate $\dot{\gamma}$ of the melt flow by using the mass growth rate of the extruded melt according to a formula (1) as follows:

$$\dot{\gamma} = C\frac{w}{\rho}, \quad (1)$$

where $\rho$ represents a melt density, and $C=1.02\times10^4/cm^3$ is a device constant;

at a step A1.2, obtaining a shear stress t of the melt flow by using the inlet pressure data P of the capillary according to a formula (2) as follows:

$$\tau = \frac{P - P_0}{120}, \quad (2)$$

where $P_0$ represents an atmospheric pressure of an experimental environment, and is taken as 0.1 MP;

at a step A1.3, obtaining the apparent shear viscosity $\eta_a$ of the melt flow by using the calculated values $\tau$ and $\dot{\gamma}$ according to a formula (3) as follows:

$$\eta_a = \frac{\tau}{\dot{\gamma}} \times 10^6, \quad (3)$$

where $\tau$ represents the shear stress of the melt flow, and $\dot{\gamma}$ represents the shear rate of the melt flow.

In an embodiment, at the step A1, the $\eta_a$ is calculated with 60 seconds as a data period.

In an embodiment, at the step A2, the outlet expansion rate $\delta$ of the melt is calculated by using the diameter D' of the melt strip according to a formula (4) as follows:

$$\delta = \frac{D' - 1000}{1000} \times 100\%. \quad (4)$$

In an embodiment, at the step A3, the set percentage is equal to 10%.

In an embodiment, at the step A4, the reference sample is made by using a low-density polyethylene (LDPE) resin, a cross-linking agent and an antioxidant, wherein the cross-linking agent is diisopropylbenzene peroxide-DCP, the antioxidant is an antioxidant 1010, and the reference sample is prepared according to a proportion of 2 phr DCP and 0.3 phr antioxidant 1010 added to 100 phr LDPE.

In an embodiment, at the step A4, a rotate speed of the screw extruder is adjusted during the testing to allow an initial shear rate of the extruded melt to be within a range of 1000 to $1200s^{-1}$, and the experimental testing is performed continuously at the rotate speed to finally determine the starting time of the cross-linking reaction of the reference sample.

In an embodiment, at the step A5, the index $\alpha$ is defined according to a formula (5) as follows:

$$\alpha = \frac{T_X - T_S}{T_S} \times 100\%, \quad (5)$$

when $\alpha>0$, it means that the continuous extrusion processing characteristic of the tested material is higher than that of the reference sample, and the larger the value of a, the longer the time during which the material is continuously processed in a device;

when $\alpha<0$, it means that the continuous extrusion processing characteristic of the tested material is lower than that of the reference sample, and the larger the absolute value of a, the shorter the time during which the material is continuously processed in the device.

In the second aspect of the present disclosure, an apparatus for evaluating and optimizing a continuous extrusion processing characteristic of a high-voltage cable insulation material is provided, the testing apparatus includes: a single-screw extruder with set specifications and a capillary extrusion mold, a melt of a tested material is continuously extruded through the capillary by the single-screw extruder under a set extrusion processing condition;

a multi-hole throttling device is provided at an inlet of the capillary mold, and a polymer melt enters the extrusion capillary through the multi-hole throttling device;

a melt pressure sensor is provided at the inlet of the capillary and is configured to continuously measure a melt pressure at the inlet of the capillary;

for the melt after being extruded through the capillary, a mass of the extruded melt is continuously measured per unit time by an automatic weighing device;

a non-contact optical diameter measuring instrument is provided at an outlet for the extruded melt and is configured to continuously measure a diameter of a melt strip extruded.

In an embodiment, the specifications of the single-screw extruder in the testing apparatus include: a screw diameter is equal to @20 mm, an aspect ratio is equal to 20:1, a compression ratio is equal to 1:1.18; the weighing device has a range of 100 g and an accuracy of 1 mg; a diameter gauge has a range of 5 mm and an accuracy of 5 μm.

In an embodiment, the throttling device includes two 100-mesh and one 500-mesh stainless steel filters which form a sandwich structure, the throttling device is mounted at the inlet of the capillary mold, the capillary mold with the throttling device as a whole is connected to the single-screw extruder.

In an embodiment, parameters of a capillary mold core include: a capillary diameter D satisfying D=1.0±0.013 mm, a capillary length L satisfying L=30.0±0.13 mm, an inlet angle A satisfying A=40°=0°30'.

In the third aspect of the present disclosure, a method for optimizing continuous extrusion processing of a high-voltage cable cross-linked polyethylene insulation material is provided, including:

at a step B1, using a set cross-linkable polyethylene insulation material, and selecting a small single-screw extruder with a similar structure and the same number of heating sections as a large extruder according to the number of heating sections of the large extruder used in an actual production;

at a step B2, heating the cross-linkable polyethylene insulation material into a melt under set process conditions, continuously extruding the melt through the capillary mold by the single-screw extruder, continuously measuring and recording an inlet pressure P of the capillary, a mass growth rate w of an extruded melt, and the diameter D' of an melt strip during the extrusion, and obtaining an apparent shear viscosity $\eta_a$ of a melt flow;

at a step B3, calculating an outlet expansion rate δ of the melt by using the diameter D' of the melt strip;

at a step B4, recording and displaying curves $\eta_a(t)$ and δ(t) of the apparent shear viscosity and outlet expansion rate of the melt changing with time, determining time corresponding to an increase of a set percentage in the $\eta_a(t)$ or δ(t) on the curve $\eta_a(t)$ or δ(t) as the starting time of the cross-linking reaction, and recording the time as $T_X$;

at a step B5, providing a plurality of groups of different process conditions, continuously extruding the melt of the tested material through the capillary mold under each group of process conditions, retesting the starting time $T_X$ of the cross-linking reaction of the material, and obtaining a value of the $T_X$ related to each group of process conditions;

at a step B6, determining a shear viscosity corresponding to a maximum value of $T_X$ as a numerical characteristic of the melt in an optimal flow state, and determining the group of process conditions corresponding to the shear viscosity as a group of optimal conditions for the extrusion processing of a long-length submarine cable;

at a step B7, setting production process parameters of an actual extruder according to a rule of obtaining process parameters through the testing of the small extruder at the step B6, and fine-tuning the production process parameters to obtain the optimal process parameters.

In an embodiment, at the step B2, the process conditions include a screw speed of the single-screw extruder and an operating temperature of each heating section.

In an embodiment, the step B2 includes:

at a step B2.1, calculating a shear rate $\dot{\gamma}$ of the melt flow by using the mass growth rate w of the extruded melt according to a formula (1) as follows:

$$\dot{\gamma} = C\frac{w}{\rho}, \quad (1)$$

where ρ represents a melt density, and C=1.02×10⁴/cm³ is a device constant;

at a step B2.2, obtaining a shear stress t of the melt flow by using the inlet pressure P of the capillary according to a formula (2) as follows:

$$\tau = \frac{P - P_0}{120}, \quad (2)$$

where $P_0$ represents an atmospheric pressure of an experimental environment, and is taken as 0.1 MPa;

at a step B2.3, obtaining an apparent shear viscosity $\eta_a$ of the melt flow by using the calculated values τ and $\dot{\gamma}$ according to a formula (3) as follows:

$$\eta_a = \frac{\tau}{\dot{\gamma}} \times 10^6, \quad (3)$$

where τ represents the shear stress of the melt flow, and the $\dot{\gamma}$ represents the shear rate of the melt flow.

In an embodiment, at the step B2, the $\eta_a$ is calculated with 60 seconds as a data period.

In an embodiment, at the step B3, the outlet expansion rate δ of the melt is calculated by using the diameter D' of the melt strip according to a formula (4) as follows:

$$\delta = \frac{D' - 1000}{1000} \times 100\%; \quad (4)$$

the curves $\eta_a(t)$ and δ(t) of the apparent shear viscosity and the outlet expansion rate of the melt changing with time are recorded and displayed in real time.

In an embodiment, at the step B4, the set percentage is equal to 10%.

In an embodiment, at the step B5, temperature of each heating section and an extruder head and the screw speed are not identical for each group of process conditions.

In the fourth aspect of the present disclosure, an apparatus for optimizing continuous extrusion processing of a high-voltage cable cross-linked polyethylene insulation material is provided, the apparatus includes: a single-screw extruder with set specifications and a capillary extrusion mold, a melt of a tested material is continuously extruded through the capillary by the single-screw extruder under a set extrusion processing condition;

a multi-hole throttling device is provided at an inlet of the capillary mold, and a polymer melt enters the extrusion capillary through the multi-hole throttling device;

a melt pressure sensor is provided at the inlet of the capillary and is configured to continuously measure a melt pressure at the inlet of the capillary;

for the melt after being extruded through the capillary, a mass of an extruded melt is continuously measured per unit time by an automatic weighing device;

a non-contact optical diameter measuring instrument is provided at an outlet of the extruded melt and is configured to continuously measure a diameter of a melt strip extruded.

In an embodiment, the single-screw extruder has a similar structure and the same number of heating sections as a large extruder used in an actual production.

In an embodiment, in the apparatus, the specifications of the single-screw extruder include: a screw diameter is equal to @20 mm, an aspect ratio is equal to 20:1, a compression ratio is equal to 1:1.18, the weighing device has a range of 100 g and an accuracy of 1 mg, a diameter gauge has a range of 5 mm and an accuracy of 5 μm.

In an embodiment, the throttling device includes two 100-mesh and one 500-mesh stainless steel filters which form a sandwich structure, the throttling device is mounted at the inlet of the capillary mold, the capillary mold with the throttling device as a whole is connected to the single-screw extruder.

In an embodiment, parameters of a capillary mold core include: a capillary diameter D satisfying D=1.0±0.013 mm, a capillary length L satisfying L=30.0±0.13 mm, an inlet angle A satisfying A=40°±0° 30'.

The details of one or more embodiments of the present disclosure are set forth in the accompanying drawings and the description below. Other features, purposes, and advantages of the present disclosure will be apparent from the description and drawings, and from the claims.

BRIEF DESCRIPTION OF THE DRAWINGS

In order to more clearly illustrate the technical solution in the embodiments of the present disclosure or in the conventional technology, accompanying drawings required for the descriptions of the embodiments or the conventional technology are briefly introduced below. Obviously, the drawings described below are merely embodiments of the present disclosure, and those skilled in the art can obtain other drawings based on the disclosed drawings without paying any creative work.

FIG. 1 is a flow chart showing a method for evaluating a continuous extrusion processing characteristic of an insulation material according to some embodiments.

Figure 2:
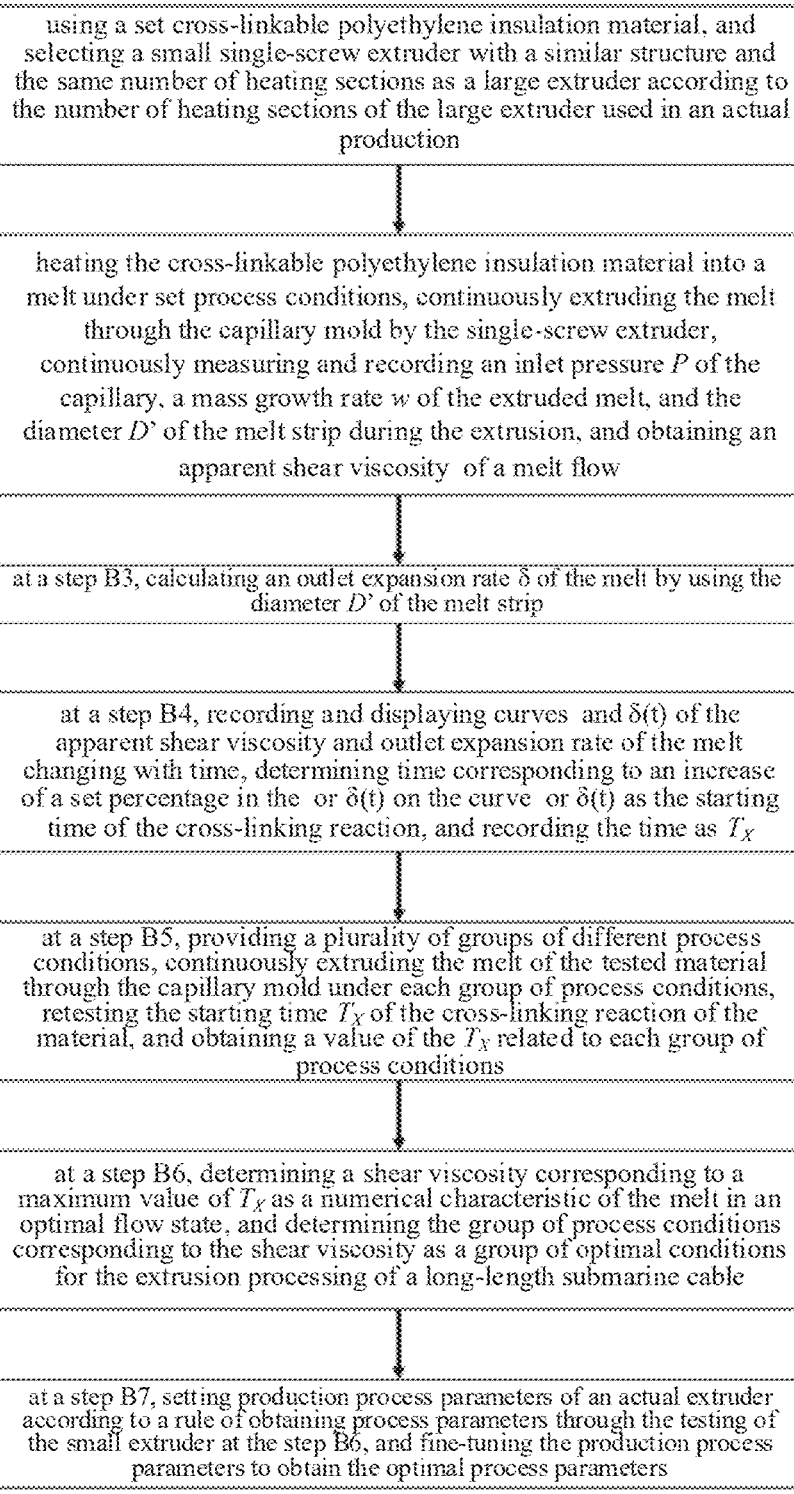
FIG. 2 is a flow chart showing a method for optimizing a continuous extrusion process of an insulation material according to some embodiments.

In the figures,
1, 100-mesh stainless steel filter; 2, 500-mesh stainless steel filter; 3, capillary mold inlet; 4, pressure sensor; 5, heating jacket; 6, capillary mold outlet; 7, non-contact optical diameter gauge.

DETAILED DESCRIPTION OF THE EMBODIMENTS

The technical solution in the embodiments of the present disclosure will be clearly and completely described below in conjunction with the drawings in the embodiments of the present disclosure. Obviously, the described embodiments are merely some embodiments of the present disclosure, rather than all of the embodiments. Based on the embodiments in the present disclosure, all other embodiments obtained by those skilled in the art without any creative work shall fall within the scope of protection of the present disclosure.

Based on the principle that pre-crosslinking of polyethylene material may cause changes in shear viscosity and melt extrusion expansion rate, the present disclosure designs a device for continuously monitoring changes in the shear viscosity and extrusion expansion rate of a polyethylene cable insulation material melt in a continuous extrusion process. A continuous extrusion processing characteristic of the material is quantitatively characterized through the continuous changes in the shear viscosity and extrusion expansion rate with extrusion processing time. Based on the present disclosure, two main purposes can be achieved: (1) evaluation of the continuous extrusion processing characteristic of a cross-linked polyethylene insulation material for a high-voltage cable; and (2) optimization and determination of an optimal process condition for continuous extrusion processing of a long-length submarine cable.

In embodiment (I), an evaluation of a continuous extrusion processing characteristic of a cross-linked polyethylene insulation material for a high-voltage cable is implemented.

In order to characterize and evaluate the continuous extrusion processing characteristic of the cross-linked polyethylene cable insulation material and objectively reflect differences between different materials, it is actually necessary to find a length of processing time during which the material undergoes from the beginning of processing until noticeable pre-crosslinking occurs under the same extrusion process condition, and the length of processing time serves as a quantitative index for characterizing the continuous processing characteristic of the material.

A technical principle and a testing method for characterizing a continuous extrusion processing characteristic of a high-voltage submarine cable insulation material are provided as follows.

At step A1, the tested material is heated to a melt at a temperature of 115±2° C., and the melt is continuously extruded through a capillary mold by a single screw extruder at an appropriate screw speed (the appropriate screw speed should be set according to a condition given when describing testing of a reference sample, and shear rates of the tested sample and the reference sample should be set to the same). During the extrusion process, an inlet pressure P (MPa) of the capillary, a mass growth rate w (g/s) of an extruded melt, and a diameter D' (μm) of a melt strip are continuously measured and recorded. The following calculations are performed with 60 seconds as a data period.

At step A1.1, the shear rate $\dot{\gamma}$ (s$^{-1}$) of melt flow is calculated using the mass growth rate w of the extruded melt according to a formula (1):

$$\dot{\gamma} = C\frac{w}{\rho}. \quad (1)$$

In the formula, p (g/cm$^3$) represents a melt density, and C=1.02×10$^4$/cm$^3$ is a device constant.

At step A1.2, the shear stress t (MPa) of the melt flow is obtained by using the pressure data of the capillary inlet according to a formula (2):

$$\tau = \frac{P - P_0}{120}. \quad (2)$$

In the formula, $P_0$ represents an atmospheric pressure of the experimental environment, which may usually be taken as 0.1 MPa.

At step A1.3, an apparent shear viscosity $\eta_a$ (Pa's) of the melt flow is obtained using the calculated values $\tau$ and $\dot\gamma$ according to a formula (3):

$$\eta_a = \frac{\tau}{\dot\gamma} \times 10^6. \tag{3}$$

At step A2, while completing the step A1, an outlet expansion rate $\delta$ (%) of the melt is calculated using the diameter D' of the strip according to a formula (4):

$$\delta = \frac{D' - 1000}{1000} \times 100\%. \tag{4}$$

At step A3, curves $\eta_a(t)$ and $\delta(t)$ of the apparent shear viscosity and outlet expansion rate of the melt changing with time are recorded and displayed in real time.

If molecular chains of the material do not cross-link during the extrusion process, the shear viscosity and outlet expansion rate of the melt are stable values, that is, $\eta_a(t)$ and $\delta(t)$ are substantially horizontal curves. If the material undergoes a certain degree of pre-crosslinking, a gel point may be formed in the melt. At the moment, a flux of the melt may decrease when the melt passes through the throttling device, which may cause the apparent shear viscosity obtained in the testing to increase significantly, and the outlet expansion rate of the melt may also increase.

Figure 6:
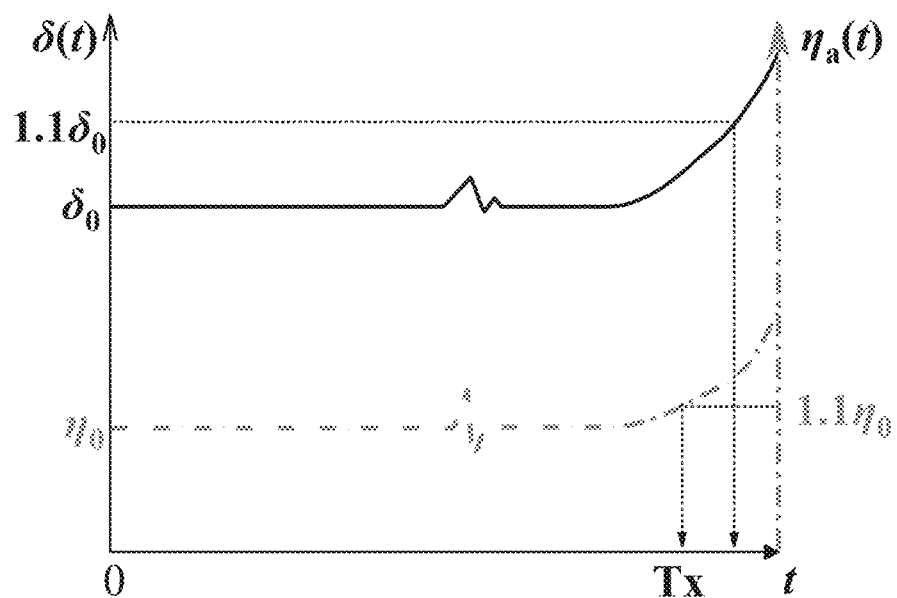
FIG. 6 is a schematic curve diagram of $\eta_a(t)$, $\delta(t)$ changing with time according to some embodiments.

The increase of $\eta_a(t)$ or $\delta(t)$ exceeding a certain percentage (preferably 10%) is used as a criterion. When either $\eta_a(t)$ or $\delta(t)$ reaches more than 1.1 times of an initial value, it indicates that the material has begun to pre-crosslink. At this point, the experiment is stopped, and time corresponding to an increase of 10% in $\eta_a(t)$ or $\delta(t)$ is found on the curve $\eta_a(t)$ or $\delta(t)$ as the starting time of the cross-linking reaction, and is recorded as $T_X$. The curves are as shown in FIG. 6.

At step A4, a reference sample is selected, the reference sample is tested according to steps A1 to A3, and the starting time $T_S$ of the cross-linking reaction of the reference sample is determined according to the curves $\eta_a(t)$ and $\delta(t)$ of the reference sample.

In order to reduce the effect of parameters and structural differences of different experimental devices on the experimental result, the test result is further processed by using the reference sample. A low-density polyethylene (LDPE) resin, a cross-linking agent (diisopropylbenzene peroxide-DCP) and an antioxidant (antioxidant 1010) used in the industry to manufacture high-voltage cable insulation material are recommended for the reference sample, and the reference sample is prepared according to a proportion of 2 phr DCP and 0.3 phr antioxidant 1010 added to 100 phr LDPE.

The curves $\eta_a(t)$ and $\delta(t)$ of the reference sample are tested according to the above principle, when the testing starts, the rotate speed of the screw extruder should be adjusted so that the initial shear rate of the extruded melt is within a range of 1000 to 1200s$^{-1}$, and the experimental testing is performed continuously at the speed to finally determine the starting time of the cross-linking reaction of the reference sample, which is recorded as $T_S$.

At step A5, an index $\alpha$ is defined according to $T_X$ and $T_S$ as a digital characteristic quantity for characterizing the continuous extrusion processing characteristic of the tested material. The index $\alpha$ is defined according to the following formula (5):

$$\alpha = \frac{T_X - T_S}{T_S} \times 100\%. \tag{5}$$

If $\alpha>0$, it means that the continuous extrusion processing characteristic of the tested material is higher than that of the reference sample, and the larger the value of a, the longer the time during which the material can be continuously processed in the device.

If $\alpha<0$, it means that the continuous extrusion processing characteristic of the tested material is lower than that of the reference sample, and the larger the absolute value of a, the shorter the time during which the material can be continuously processed in the device.

Figure 3:
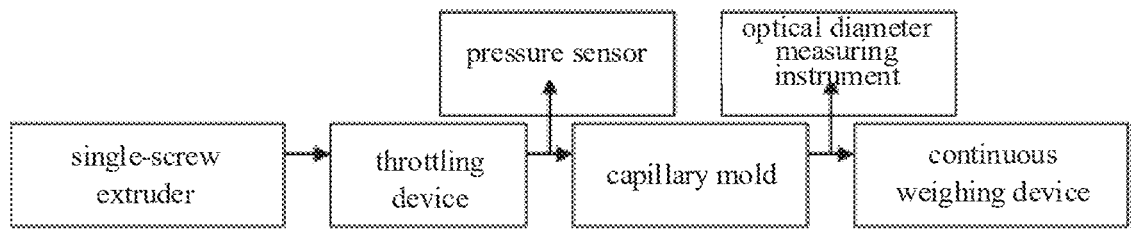
FIG. 3 is a schematic diagram of a melt extrusion testing device according to some embodiments.

The block diagram of the principle of the testing device is shown in FIG. 3, through which curves of the three parameters, namely the pressure P of the melt of the tested material flowing through the capillary inlet, the mass m of the extruded melt per unit time, and the diameter D' of the extruded melt strip changing with time can be continuously acquired as basic data.

The testing device may specifically include a single-screw extruder with specific specifications and a capillary extrusion mold, which is configured to continuously extrude the melt of the tested material through the capillary under a specific extrusion processing condition (the temperature of the extruder is set in a range of 105° C. to 120° C.). The specifications of the single-screw extruder in the testing device are recommended as that: a screw diameter is equal to @20 mm, an aspect ratio is equal to 20:1, a compression ratio is equal to 1:1.18; the weighing device has a range of 100 g and an accuracy of 1 mg; the diameter gauge has a range of 5 mm and an accuracy of 5 μm.

Figure 4A:
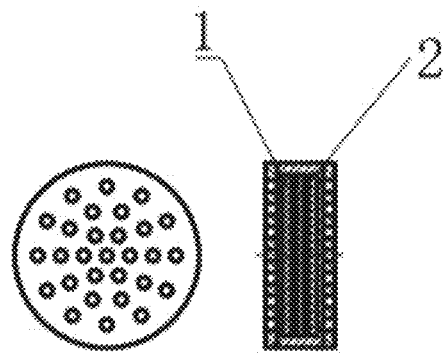
FIG. 4a is a schematic diagram of a throttling device according to some embodiments.
Figure 4B:
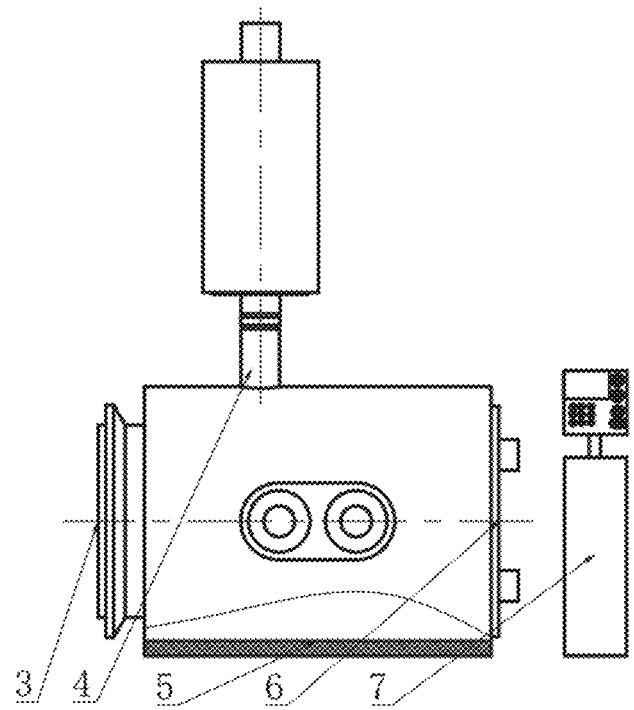
FIG. 4b is a schematic diagram illustrating a matching mode of a capillary mold, a throttling device, a diameter gauge, and a pressure sensor according to some embodiments.

A multi-hole throttling device is provided at the inlet of the capillary mold, through which the polymer melt enters the extrusion capillary. The throttling device has a sandwich structure consisting of two 100-mesh and one 500-mesh stainless steel filters, as shown in FIG. 4 (*a*). The throttling device is mounted at the inlet of the capillary mold, as shown in FIG. 4 (*b*). The capillary mold with the throttling device as a whole is connected to the single-screw extruder.

Figure 5:
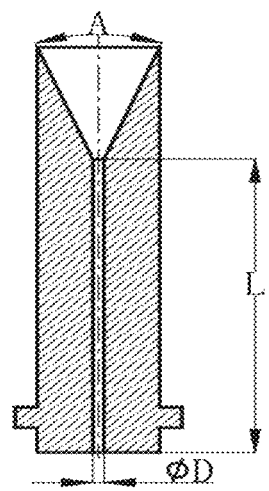
FIG. 5 is a schematic diagram of a capillary mold core according to some embodiments.

A melt pressure sensor is provided at the inlet of the capillary and is configured to continuously measure the melt pressure at the inlet of the capillary. The capillary mold core is as shown in FIG. 5. The recommended parameters include: the capillary diameter D satisfies that D=1.0±0.013 mm, the capillary length L satisfies that L=30.0±0.13 mm, an inlet angle A satisfies that A=40°=0° 30'.

For the melt after being extruded through the capillary, an automatic weighing device is employed to continuously measure the mass of the extruded melt per unit time.

A non-contact optical diameter measuring instrument is provided at the outlet for the extruded melt and is configured to continuously measure the diameter of the extruded melt strip.

In embodiment (II), an optimal process condition for continuous extrusion processing of a long-length submarine cable is optimized and determined.

In order to optimize and determine the optimal process condition for continuous extrusion processing of the long-length submarine cable, it is necessary to evaluate the length of processing time during which the material undergoes from the beginning of processing to the occurrence of noticeable pre-crosslinking under different extrusion process conditions, on the premise of determining the material category. The length of processing time serves as a quantitative index for evaluating and adjusting the processing parameters. Through experiments, a set of process parameters that maximizes the length of processing time can be optimally obtained. The set of process parameters can provide data reference for determining and optimizing the optimal process condition for continuous extrusion processing of the long-length submarine cable.

The technical principle and optimization method for optimizing and determining the optimal process condition for continuous extrusion processing of the long-length submarine cable are provided as follows.

At step B1, a set cross-linkable polyethylene insulation material is used, and a small single-screw extruder with a similar structure and the same number of heating sections as a large extruder is selected according to the number of heating sections of the large extruder used in the actual production.

At step B2, the tested material is heated into a melt under a set group of process conditions (including a temperature of each heating section and the screw speed), and the melt is continuously extruded through the capillary mold by the single-screw extruder. During the extrusion process, the inlet pressure P (MPa) of the capillary, the mass growth rate w (g/s) of the extruded melt, and the diameter D' (μm) of the melt strip are continuously measured and recorded. The calculations are performed with 60 seconds as one data period as follows.

At step B2.1, the shear rate γ ($s^{-1}$) of the melt flow is calculated using the mass growth rate of the extruded melt according to the formula (1):

$$\dot{\gamma} = C \frac{e}{\rho}. \qquad (1)$$

In the formula, p (g/cm$^3$) represents the melt density, and C=1.02×10$^4$/cm$^3$ is the device constant.

At step B2.2, the shear stress t (MPa) of the melt flow is obtained using the inlet pressure of the capillary according to the formula (2):

$$\tau = \frac{P - P_0}{120}. \qquad (2)$$

In the formula, $P_0$ represents the atmospheric pressure of the experimental environment, which is usually taken as 0.1 MPa.

At step B2.3, the apparent shear viscosity $\eta_a$ (Pa's) of the melt flow is obtained using the calculated values τ and γ according to the formula (3):

$$\eta_a = \frac{\tau}{\dot{\gamma}} \times 10^6. \qquad (3)$$

At step B3, while the step B2 is completed, the outlet expansion rate δ (%) of the melt is calculated using the diameter D' of the melt strip according to the formula (4):

$$\delta = \frac{D' - 1000}{1000} \times 100\%. \qquad (4)$$

At step B4, the curves $\eta_a(t)$ and δ(t) of the apparent shear viscosity and outlet expansion rate of the melt changing with time are recorded and displayed in real time. If the molecular chains of the material are not cross-linked during the extrusion process, the shear viscosity and outlet expansion rate of the melt are stable values, and $\eta_a(t)$ and δ(t) are substantially horizontal curves. If the material undergoes a certain degree of cross-linking, a gel point may be formed in the melt. At the moment, the flux of the melt may decrease when passing through the throttling device, so that the apparent shear viscosity obtained in the testing may significantly increase, and the outlet expansion rate of the melt may also increase.

The increase of $\eta_a(t)$ or δ(t) exceeding a certain percentage (preferably 10%) is taken as a criterion, when either $\eta_a(t)$ or δ(t) reaches more than 1.1 times of an initial value, it indicates that the material starts the pre-crosslinking. At the moment, the experiment is stopped, and the time corresponding to the increase of 10% in $\eta_a(t)$ or δ(t) is found on the curve $\eta_a(t)$ or δ(t) as the starting time of the cross-linking reaction, and is recorded as $T_X$. The curves are as shown in FIG. 6.

At step B5, the screw speed and operating temperature of the screw extruder are taken as the process conditions, these parameters are adjusted, and a plurality of groups of different process conditions (including the temperatures of each heating section and the extruder head and the screw speed) are set, the melt of the tested material is continuously extruded through the capillary mold under each group of process conditions, the starting time $T_X$ of the cross-linking reaction of the material is retested, and the $T_X$ value related to each group of process conditions is obtained.

At step B6, the shear viscosity corresponding to the maximum value of $T_X$ is taken as a numerical characteristic of the melt in an optimal flow state, and the group of process conditions corresponding to the shear viscosity is taken as a group of optimal conditions for the extrusion processing of the long-length submarine cable.

At step B7, production process parameters of the actual extruder are set according to the rule of obtaining process parameters through the testing of the small extruder and are fine-tuned, and the optimal process parameters are obtained, thereby reducing the testing time on the large extruder and reducing waste of materials and extruder production capacity.

The block diagram of the principle of the optimization apparatus is shown in FIG. 3, the apparatus can continuously acquire the curves of the pressure P of the melt of the tested material flowing through the capillary inlet, the mass m of the extruded melt per unit time, and the diameter D' of the extruded melt strip changing with time as basic data.

The optimization apparatus may specifically include: a small single-screw extruder, which has a similar structure to the large extruder used in the actual production and the same number of heating sections as the large extruder, a weighing device with a range of 100 g and an accuracy of 1 mg, a diameter gauge with a range of 5 mm and an accuracy of 5 μm. The number of heating section partitions can be set according to the number of heating section partitions of an extruder to be used in actual cable production. If necessary, the specification parameters of the extruder can be adjusted to adapt to the implementation of the number of heating section partitions.

A multi-hole throttling device is provided at the inlet of the capillary mold, through which the polymer melt enters the extrusion capillary. The throttling device has a sandwich structure consisting of two 100-mesh and one 500-mesh stainless steel filters, as shown in FIG. 4 (a). The throttling device is mounted at the inlet of the capillary mold, as shown in FIG. 4 (b). The capillary mold with the throttling device as a whole is connected to the single-screw extruder.

A melt pressure sensor is provided at the inlet of the capillary and is configured to continuously measure the melt pressure at the inlet of the capillary. The capillary mold core is as shown in FIG. 5. The recommended parameters include: the capillary diameter D satisfies that D=1.00±0.01 mm, the capillary length L satisfies that L=30.010.1 mm, an inlet angle A satisfies that A=40°±0° 30'.

For the melt after being extruded through the capillary, an automatic weighing device is employed to continuously measure the mass of the extruded melt per unit time.

A non-contact optical diameter measuring instrument is provided at the outlet for the extruded melt and is configured to continuously measure the diameter of the melt strip extruded.

Compared to the conventional technology, beneficial effects of the present disclosure are provided as follows.

(1) The inventors have found in their long-term research that the long-term extrusion processing characteristic of the cross-linkable polyethylene insulation material is jointly determined by a rheological characteristic and a chemical characteristic of the cross-linking reaction of the material. The conventional methods for characterizing the extrusion processing property of the cross-linkable polyethylene insulation material mostly use various types of rheometers (such as torque rheometers, rotational rheometers, high-pressure capillary rheometers, etc.) to test the rheological characteristic of the material. Due to the small total mass of the tested material, a cavity space where the melt is located is small, and the continuous testing time is short, the rheological characteristic parameter of the material has low sensitivity to pre-crosslinking at the extrusion processing temperature of the material. Accordingly, the testing parameters related to the pre-crosslinking characteristic of the material is definitely obtained at a higher temperature (higher than the decomposition temperature of the cross-linking agent DCP). In addition, the relevant tests can only make qualitative and inaccurate inferences about the long-term extrusion processing property. Since the testing temperature deviates from (is higher than) the long-term extrusion process condition in the actual production process of the insulation material, the testing result has less reference. In the present disclosure, an extruder with a throttling device and a capillary mold is employed to perform uninterrupted extrusion of the melt, and the continuous testing time is not limited. Under the premise of more realistic simulation of the process of the cable insulation extrusion processing, not only more realistic property parameters can be measured, but also a lot of experimental material consumption is saved.

(2) The extrusion processing and testing device of the present disclosure can provide a plurality of parameters for quantitatively evaluating the long-term extrusion processing property of the cross-linkable polyethylene insulation material, the material can be optimized through the quantitative parameters, or a clear optimization target direction can be provided for setting the processing parameters of the extruder. The method of using a low-power extruder to simulate a large production device can save materials and explore the optimal process parameters, which can not only save a lot of production device capacity, but also save a lot of experimental cycles and material consumption.

(3) Compared to the conventional testing method of periodically and manually measuring the expansion rate and the mass of the extruded melt, the plurality of quantitative parameters described in the present disclosure are obtained and continuously recorded by automatic testing of the device, which can continuously and uninterruptedly acquire the changes in important parameters during the long-term extrusion processing of the material, and can acquire more information on the changes in the material during the extrusion processing. Accordingly, an exact time point when the material property changes due to the pre-crosslinking can be accurately discovered, and the evaluation of the long-term extrusion processing property of the material is more accurate and reliable.

(4) The present disclosure provides a throttling device with a sandwich structure consisting of multiple layers of filters. The throttling device consists of high-precision filters. The filter has a certain obstruction effect on the flow of the melt, the filer and the capillary mold connected to it together form a part of area with low melt fluidity (which can be figuratively referred to as a flow dead corner). Such coordination mode simulates the existence of processing dead corners in the extruder during the actual extrusion processing and production processes. The existence of dead corners may cause the retained melt material to be pre-crosslinked, thereby deteriorating the quality of the insulation layer, and the cable may therefore not be able to be continuously extruded for a long time. The apparatus provided by the present disclosure can fully test the problems of pre-crosslinking and long-term extrusion property deterioration caused by dead corners of the melt flow, and fully simulate the specific problems in the actual production process of the cables. Accordingly, the result obtained according to the method of the present disclosure has better practical disclosure reference value.

The technical features in the above embodiments may be combined arbitrarily. In order to make the description concise, all possible combinations of the technical features in the above embodiments are not described. However, as long as there is no contradiction in the combinations of these technical features, these combinations should be considered to be within the scope of the present disclosure.

The above-described embodiments only express several implementation modes of the present disclosure, and the descriptions are relatively specific and detailed, but should not be construed as limiting the scope of the present disclosure. It should be noted that, those of ordinary skill in the art can make several modifications and improvements without departing from the concept of the present disclosure, and these all fall within the protection scope of the present disclosure. Therefore, the protection scope of the present disclosure should be subject to the appended claims.

The invention claimed is:

1. A method for evaluating and optimizing a continuous extrusion processing characteristic of a high-voltage cable insulation material, comprising:
   at a step A1, heating a tested material to a melt at a set temperature, continuously extruding the melt through a capillary mold, continuously measuring and recording an inlet pressure P of a capillary, a mass growth rate w of an extruded melt, and a diameter D' of a melt strip during the extrusion, obtaining an apparent shear viscosity $\eta_a$ of a melt flow;
   at a step A2, calculating an outlet expansion rate $\delta$ of the melt by using the diameter D' of the melt strip;
   at a step A3, recording and displaying curves $\eta_a(t)$ and $\delta(t)$ of the apparent shear viscosity and the outlet expansion rate of the melt changing with time, determining time corresponding to an increase of a set percentage in the $\eta_a(t)$ or $\delta(t)$ on the curve $\eta_a(t)$ or $\delta(t)$ as starting time of a cross-linking reaction, which is recorded as $T_X$;

at a step A4, selecting a reference sample, testing the reference sample according to the steps A1 to A3, and determining starting time $T_S$ of a cross-linking reaction of the reference sample according to the curves $\eta_a(t)$ and $\delta(t)$ of the reference sample;

at a step A5, defining an index $\alpha$ according to the $T_X$ and $T_S$ as a digital characteristic quantity for characterizing the continuous extrusion processing characteristic of the tested material.

2. The method according to claim 1, wherein the step A1 includes:

at a step A1.1, calculating a shear rate $\dot{\gamma}$ of the melt flow by using the mass growth rate of the extruded melt according to a formula (1) as follows:

$$\dot{\gamma} = C\frac{w}{p}, \quad (1)$$

where $\rho$ represents a melt density, and $C=1.02\times10^4/cm^3$ is a device constant;

at a step A1.2, obtaining a shear stress t of the melt flow by using the inlet pressure P of the capillary according to a formula (2) as follows:

$$\tau = \frac{P - P_0}{120}, \quad (2)$$

where $P_0$ represents an atmospheric pressure of an experimental environment, and is taken as 0.1 MP;

at a step A1.3, obtaining the apparent shear viscosity $\eta_a$ of the melt flow by using the calculated values $\tau$ and $\dot{\gamma}$ according to a formula (3) as follows:

$$\eta_a = \frac{T}{\dot{\gamma}} \times 10^6, \quad (3)$$

where $\tau$ represents the shear stress of the melt flow, and $\dot{\gamma}$ represents the shear rate of the melt flow.

3. The method according to claim 1, wherein at the step A1, the $\eta_a$ is calculated with 60 seconds as a data period.

4. The method according to claim 1, wherein at the step A2, the outlet expansion rate $\delta$ of the melt is calculated by using the diameter D' of the melt strip according to a formula (4) as follows:

$$\delta = \frac{D' - 1000}{1000} \times 100\%. \quad (4)$$

5. The method according to claim 1, wherein at the step A3, the set percentage is equal to 10%.

6. The method according to claim 1, wherein at the step A4, the reference sample is made by using a low-density polyethylene (LDPE) resin, a cross-linking agent and an antioxidant, wherein the cross-linking agent is diisopropylbenzene peroxide-DCP, the antioxidant is an antioxidant 1010, and the reference sample is prepared according to a proportion of 2 phr DCP and 0.3 phr antioxidant 1010 added to 100 phr LDPE.

7. The method according to claim 1, wherein at the step A4, a rotate speed of the screw extruder is adjusted during the testing to allow an initial shear rate of the extruded melt to be within a range of 1000 to $1200s^{-1}$, and the experimental testing is performed continuously at the rotate speed to finally determine the starting time of the cross-linking reaction of the reference sample.

8. The method according to claim 1, wherein at the step A5, the index $\alpha$ is defined according to a formula (5) as follows:

$$\alpha = \frac{T_X - T_S}{T_S} \times 100\%, \quad (5)$$

when $\alpha>0$, it means that the continuous extrusion processing characteristic of the tested material is higher than that of the reference sample, and the larger the value of $\alpha$, the longer the time during which the material is continuously processed in a device;

when $\alpha<0$, it means that the continuous extrusion processing characteristic of the tested material is lower than that of the reference sample, and the larger the absolute value of $\alpha$, the shorter the time during which the material is continuously processed in the device.

9. An apparatus for evaluating and optimizing a continuous extrusion processing characteristic of a high-voltage cable insulation material, configured to implement the method of claim 1, the testing apparatus comprising: a single-screw extruder with set specifications, and a capillary extrusion mold, wherein a melt of a tested material is continuously extruded through the capillary by the single-screw extruder under a set extrusion processing condition;

wherein a multi-hole throttling device is provided at an inlet of the capillary mold, and a polymer melt enters the extrusion capillary through the multi-hole throttling device;

a melt pressure sensor is provided at the inlet of the capillary and is configured to continuously measure a melt pressure at the inlet of the capillary;

for the melt after being extruded through the capillary, a mass of the extruded melt is continuously measured per unit time by an automatic weighing device;

a non-contact optical diameter measuring instrument is provided at an outlet for the extruded melt and is configured to continuously measure a diameter of a melt strip extruded.

10. The apparatus according to claim 9, wherein the specifications of the single-screw extruder in the testing apparatus comprise: a screw diameter is equal to Φ20 mm, an aspect ratio is equal to 20:1, a compression ratio is equal to 1:1.18; the weighing device has a range of 100 g and an accuracy of 1 mg; a diameter gauge has a range of 5 mm and an accuracy of 5 μm.

11. The apparatus according to claim 9, wherein the throttling device comprises two 100-mesh and one 500-mesh stainless steel filters which form a sandwich structure, the throttling device is mounted at the inlet of the capillary mold, the capillary mold with the throttling device as a whole is connected to the single-screw extruder.

12. The apparatus according to claim 9, wherein parameters of a capillary mold core comprise: a capillary diameter D satisfying D=1.0±0.013 mm, a capillary length L satisfying L=30.0±0.13 mm, an inlet angle A satisfying A=40°±0°±30'.

13. A method for optimizing continuous extrusion processing of a high-voltage cable cross-linked polyethylene insulation material, comprising:
- at a step B1, using a set cross-linkable polyethylene insulation material, and selecting a small single-screw extruder with a similar structure and the same number of heating sections as a large extruder according to the number of heating sections of the large extruder used in an actual production;
- at a step B2, heating the cross-linkable polyethylene insulation material into a melt under set process conditions, continuously extruding the melt through the capillary mold by the single-screw extruder, continuously measuring and recording an inlet pressure P of the capillary, a mass growth rate w of an extruded melt, and the diameter D' of a melt strip during the extrusion, and obtaining an apparent shear viscosity $\eta_a$ of a melt flow;
- at a step B3, calculating an outlet expansion rate $\delta$ of the melt by using the diameter D' of the melt strip;
- at a step B4, recording and displaying curves $\eta_a(t)$ and $\delta(t)$ of the apparent shear viscosity and outlet expansion rate of the melt changing with time, determining time corresponding to an increase of a set percentage in the $\eta_a(t)$ or $\delta(t)$ on the curve $\eta_a(t)$ or $\delta(t)$ as the starting time of the cross-linking reaction, and recording the time as $T_X$;
- at a step B5, providing a plurality of groups of different process conditions, continuously extruding the melt of the tested material through the capillary mold under each group of process conditions, retesting the starting time $T_X$ of the cross-linking reaction of the material, and obtaining a value of the $T_X$ related to each group of process conditions;
- at a step B6, determining a shear viscosity corresponding to a maximum value of $T_X$ as a numerical characteristic of the melt in an optimal flow state, and determining the group of process conditions corresponding to the shear viscosity as a group of optimal conditions for the extrusion processing of a long-length submarine cable;
- at a step B7, setting production process parameters of an actual extruder according to a rule of obtaining process parameters through the testing of the small extruder at the step B6, and fine-tuning the production process parameters to obtain the optimal process parameters.

14. The method for optimizing continuous extrusion processing characteristic of the high-voltage cable cross-linked polyethylene insulation material according to claim 13, wherein at the step B2, the process conditions comprise a screw speed of the single-screw extruder and an operating temperature of each heating section.

15. The method according to claim 13, wherein the step B2 comprises:
- at a step B2.1, calculating a shear rate $\dot{\gamma}$ of the melt flow by using the mass growth rate w of the extruded melt according to a formula (1) as follows:

$$\dot{\gamma} = C\frac{w}{\rho}, \quad (1)$$

where $\rho$ represents a melt density, and $C=1.02\times10^4/cm^3$ is a device constant;
- at a step B2.2, obtaining a shear stress t of the melt flow by using the inlet pressure P of the capillary according to a formula (2) as follows:

$$\tau = \frac{P - P_0}{120}, \quad (2)$$

where $P_0$ represents an atmospheric pressure of an experimental environment, and is taken as 0.1 MPa;
- at a step B2.3, obtaining an apparent shear viscosity $\eta_a$ of the melt flow by using the calculated values $\tau$ and $\dot{\gamma}$ according to a formula (3) as follows:

$$\eta_a = \frac{\tau}{\dot{\gamma}} \times 10^6, \quad (3)$$

where $\tau$ represents the shear stress of the melt flow, and the $\dot{\gamma}$ represents the shear rate of the melt flow.

16. The method according to claim 13, wherein at the step B2, the $\eta_a$ is calculated with 60 seconds as a data period;
- wherein at the step B3, the outlet expansion rate $\delta$ of the melt is calculated by using the diameter D' of the melt strip according to a formula (4) as follows:

$$\delta = \frac{D' - 1000}{1000} \times 100\%; \quad (4)$$

the curves $\eta_a(t)$ and $\delta(t)$ of the apparent shear viscosity and the outlet expansion rate of the melt changing with time are recorded and displayed;
- wherein at the step B4, the set percentage is equal to 10%;
- wherein at the step B5, temperatures of each heating section and an extruder head and the screw speed are not identical for each group of process conditions.

17. An apparatus for optimizing continuous extrusion processing of a high-voltage cable cross-linked polyethylene insulation material, configured to implement the method of claim 13,
the apparatus comprising: a single-screw extruder with set specifications, and a capillary extrusion mold,
- wherein a melt of a tested material is continuously extruded through the capillary by the single-screw extruder under a set extrusion processing condition;
- wherein a multi-hole throttling device is provided at an inlet of the capillary mold, and a polymer melt enters the extrusion capillary through the multi-hole throttling device;
- a melt pressure sensor is provided at the inlet of the capillary and is configured to continuously measure a melt pressure at the inlet of the capillary;
- for the melt after being extruded through the capillary, a mass of an extruded melt is continuously measured per unit time by an automatic weighing device;
- a non-contact optical diameter measuring instrument is provided at an outlet of the extruded melt and is configured to continuously measure a diameter of a melt strip extruded.

18. The apparatus according to claim 17, wherein the single-screw extruder has a similar structure and the same number of heating sections as a large extruder used in an actual production.

19. The apparatus for optimizing continuous extrusion processing of the high-voltage cable cross-linked polyethylene insulation material according to claim 17, wherein in the apparatus, the weighing device has a range of 100 g and an accuracy of 1 mg, a diameter gauge has a range of 5 mm and an accuracy of 5 μm.

20. The apparatus according to claim 17, wherein the throttling device comprises two 100-mesh and one 500-mesh stainless steel filters which form a sandwich structure, the throttling device is mounted at the inlet of the capillary mold, the capillary mold with the throttling device as a whole is connected to the single-screw extruder;

wherein parameters of a capillary mold core comprise: a capillary diameter D satisfying D=1.0±0.013 mm, a capillary length L satisfying L=30.0±0.13 mm, an inlet angle A satisfying A=40°±0°30'.

* * * * *